United States Patent [19]

Caola

[11] Patent Number: 5,794,802

[45] Date of Patent: Aug. 18, 1998

[54] CONTAINER FOR SEPARATION, STORAGE, AND MIXING OF INGREDIENTS

[76] Inventor: Joseph Caola, 26 Farmington Dr., Shrewsbury. Mass. 01545

[21] Appl. No.: 812,118

[22] Filed: Mar. 4, 1997

[51] Int. Cl.⁶ ............................................. A61J 9/00
[52] U.S. Cl. .................... 215/11.1; 215/DIG. 8; 206/219; 206/221
[58] Field of Search ............................. 215/11.1, 11.5, 215/DIG. 8; 206/219, 221

[56] References Cited

U.S. PATENT DOCUMENTS

| | | | |
|---|---|---|---|
| 2,653,610 | 9/1953 | Smith | 215/DIG. 8 X |
| 2,721,552 | 10/1955 | Nosik . | |
| 2,793,776 | 5/1957 | Lipari . | |
| 2,807,385 | 9/1957 | Lipari . | |
| 2,813,649 | 11/1957 | Lipari . | |
| 3,220,588 | 11/1965 | Pipari | 215/DIG. 8 |
| 3,439,823 | 4/1969 | Morane | 215/DIG. 8 X |
| 3,613,955 | 10/1971 | Wetherell, Jr. . | |
| 3,747,791 | 7/1973 | Fouser . | |
| 3,762,540 | 10/1973 | Baumann et al. . | |
| 3,779,413 | 12/1973 | Pickerell et al. . | |
| 4,203,517 | 5/1980 | Hildebrandt et al. . | |
| 4,315,570 | 2/1982 | Silver et al. | 215/DIG. 8 |
| 4,386,696 | 6/1983 | Goncalves . | |
| 4,550,825 | 11/1985 | Sutryn et al. | 206/219 X |
| 4,614,267 | 9/1986 | Larkin | 215/DIG. 8 X |
| 4,793,475 | 12/1988 | Itzel . | |
| 5,217,433 | 6/1993 | Bunin . | |
| 5,275,298 | 1/1994 | Holley, Jr. et al. . | |
| 5,295,597 | 3/1994 | Green . | |
| 5,335,773 | 8/1994 | Haber et al. | 215/DIG. 8 X |
| 5,353,964 | 10/1994 | Liu et al. . | |
| 5,419,445 | 5/1995 | Keasemeyer . | |
| 5,542,922 | 8/1996 | Petterson et al. | 215/11.1 |
| 5,634,714 | 6/1997 | Guild | 215/DIG. 8 X |

*Primary Examiner*—Allan N. Shoap
*Assistant Examiner*—Tri M. Mai
*Attorney, Agent, or Firm*—Blodgett & Blodgett, P.C.

[57] ABSTRACT

A reusable insert designed for off-the-shelf covered containers, and more specifically for baby bottles. The insert forms a storage compartment and which keeps the ingredients separated in the container. It is designed to allow the ingredients to be mixed in the same container and dispensed without removing the cover from the container. The insert generally includes a dry chamber housing 30, a chamber seal 40, and a means to release the chamber seal such as a push rod 20. When used with a baby bottle, the insert slides into the bottle portion 50. A flange at the top of the dry chamber housing 30 prevents it from moving too far into the bottle and still allows the nipple assembly 10 to be attached directly to the bottle portion 50. When the nipple assembly 10 is screwed in place, the flange is pinched between the nipple assembly 10 and bottle portion 50, forming a leak-proof seal. The dry chamber housing 30 and chamber seal 40 together form a cup-like container which stores the powdered formula prior to the ingredients being mixed. The means to release the chamber seal, in this case a push rod operates through the nipple 11 with either a push action or a combination of push/rotary action. The insert containing powdered formula slides into the open neck 51 of the bottle portion 50 containing a pre-measured amount of water and the nipple assembly 10 is screwed in place. To mix the ingredients, the user pushes on the nipple 11 which displaces the chamber seal 40 and provides a passage for water and formula to combine in both the bottle portion 50 and the dry chamber housing 30. The bottle is then shaken and the formula is dispensed. Other designs for the chamber seal 40 and the means to release the chamber seal are specified.

5 Claims, 4 Drawing Sheets

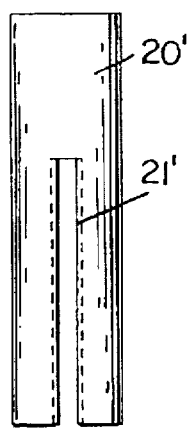
FIG. 5
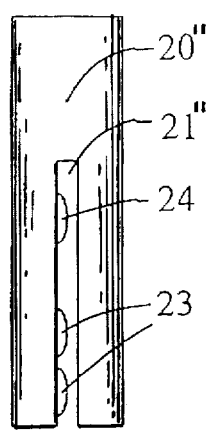
FIG. 7
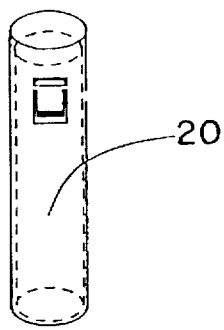
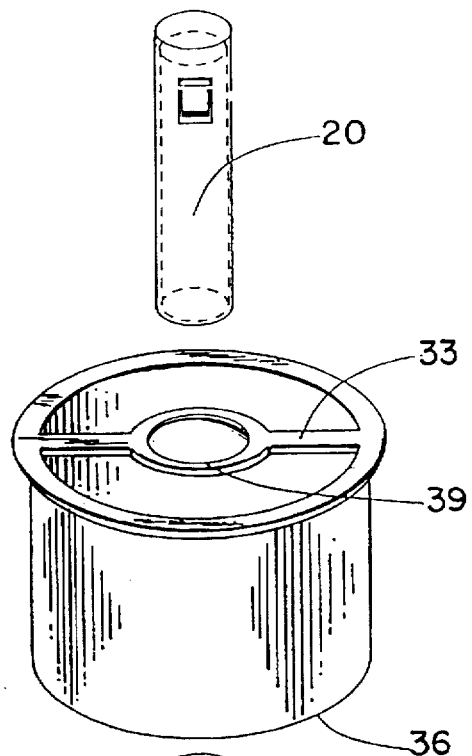
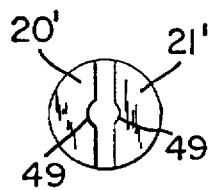
FIG. 6
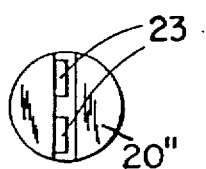
FIG. 8
FIG. 9
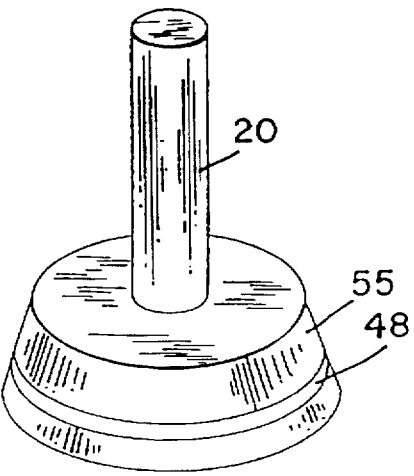
FIG. 10    FIG. 11

5,794,802

CONTAINER FOR SEPARATION, STORAGE, AND MIXING OF INGREDIENTS

BACKGROUND OF THE INVENTION

This invention relates to the storage, mixing, and dispensing of materials and more specifically to a baby bottle used to keep powdered formula and water separated until it is ready to be consumed when it can be mixed in the same bottle and dispensed as desired.

There are many circumstances which necessitate keeping ingredients separated in a container until they are ready to be mixed and dispensed. As an example, when using powdered baby formula, it is necessary to mix the formula with water producing a milky liquid which is consumed by infants and small children. Once the formula is mixed, it must be consumed within a short period of time or refrigerated.

Typically, when traveling with an infant, feeding times are not precisely known and infants are fed on demand. The feeding time is normally indicated by urgent cries from the child and it is important not to delay. Many times, the infant will not eat if it is too upset. On the road, feeding a child using powdered formula can get complicated and messy as you have to measure the required amount of formula from a can and pour this into a baby bottle containing water. Formula can be mixed ahead of time and stored in a portable insulated carrier but the formula should be consumed within two hours. This time can be extended by placing an ice pack with the formula. Any time formula is refrigerated, it is usually necessary to heat it to at least room temperature before it is consumed. Even as the child develops and feeding times are easier to plan, it can be very difficult to feed the child while on the road. Considering the number of bottles a child consumes in a day, any apparatus designed to assist the parent in feeding should be easy to clean and relatively inexpensive.

Previously, a number of containers for storing, mixing, and dispensing have been designed. U.S. Pat. No. 2,793,776 to Lipari, 1957 had a stopper which restricted the adequate mixing of ingredients and the design made it very difficult to clean. U.S. Pat. No. 5,275,298 to Holley, 1994 used an attachment affixed to the top of a conventional bottle which extended the height considerably and made it cumbersome to use. The apparatus was difficult to operate, hard to clean, and had many parts which made it more expensive to manufacture. U.S. Pat. No. 5,419,445 to Kaesemeyer had many parts as well. The apparatus used a screw type mechanism to release a cap from the bottom of the dry chamber. As designed, the cap would require close manufacturing tolerances during production and could easily leak. The screw-type operation also makes it more time consuming to take apart for cleaning.

None of the prior art mentioned was very easy to clean or use. These are necessities when designing an apparatus to be utilized so many times during each day. Designs with too many parts make it frustrating for the consumer to assemble the apparatus each time it is used. Numerous parts also demand higher costs and can lead to a higher incidence of parts getting lost which could render the device inoperative. Infants can be fed about eight times each day or more. Parents normally do not have the time to wash the apparatus between bottles. Lower costs can eliminate this requirement by making it reasonable to purchase more than one apparatus.

BRIEF SUMMARY OF THE INVENTION

A primary object of this invention is a baby bottle designed to keep powdered formula and water separated until it is ready to be consumed when it can be mixed in the same bottle and dispensed.

A further object of the invention is that it can be made with very few parts.

A further object of the invention is to provide for a means to seal the lower part of a chamber which stores the dry ingredients.

A further object of the invention is that the parts should be easy to assemble.

A further object of the invention it that the apparatus should be easy to clean.

A further object of the invention is that the parts fit together in such a way that manufacturing tolerances are easily met.

A further object of the invention is to provide a method of activating the device through the cap or nipple.

A further object of the invention is to provide for easy filling of the dry chamber.

A further object of the invention is to provide a passageway through the dry chamber for the formula to pass to the nipple after it is mixed.

A further object of the invention is to provide a method to prevent the dry powder from entering and clogging the nipple from the dry chamber.

To achieve these objectives, this invention provides for an insert to be used in conjunction with off-the-shelf baby bottles. The insert provides a compartment where the dry powder will be stored. It should be of a size and shape that it will fit into the bottle portion between the cap/nipple assembly and the lower portion of the bottle. The insert generally includes but is not limited to a primary chamber, a chamber seal, and a means to release the chamber seal. The primary chamber and chamber seal together form a cup-like container which stores the powdered formula prior to the ingredients being mixed. The means to release the chamber seal should operate through the nipple with either a push action or a combination of push/rotary action. Operation of the apparatus involves the user assembling the insert and filling it with a measured amount of powdered formula. The insert slides into the open neck of the bottle containing a pre-measured amount of water and the cap is screwed in place. To mix the ingredients, the user pushes on the nipple which displaces the chamber seal and provides a channel between the dry chamber and the bottle portion. The bottle is shaken and the formula is dispensed.

BRIEF DESCRIPTION OF THE SEVERAL VIEWS OF THE DRAWING

The present invention will be better understood by reference to the drawings in which:

FIG. 5 is a side elevational view of a first modified release member portion of the insert of the present invention;

FIG. 6 is a bottom plan view of the first modified release member;

FIG. 7 is a side elevational view of a second modified release member portion of the insert of the present invention;

FIG. 8 is a bottom plan view of the second modified release member;

FIG. 9 is an exploded perspective view of a third embodiment of the insert;

FIG. 10 is a perspective view of a modified closure portion of the insert of the present invention; and FIG. 11 is a perspective view of the modified closure of FIG. 10 combined as a single piece with a third modified release member.

DETAILED DESCRIPTION OF THE INVENTION

Figure 1:
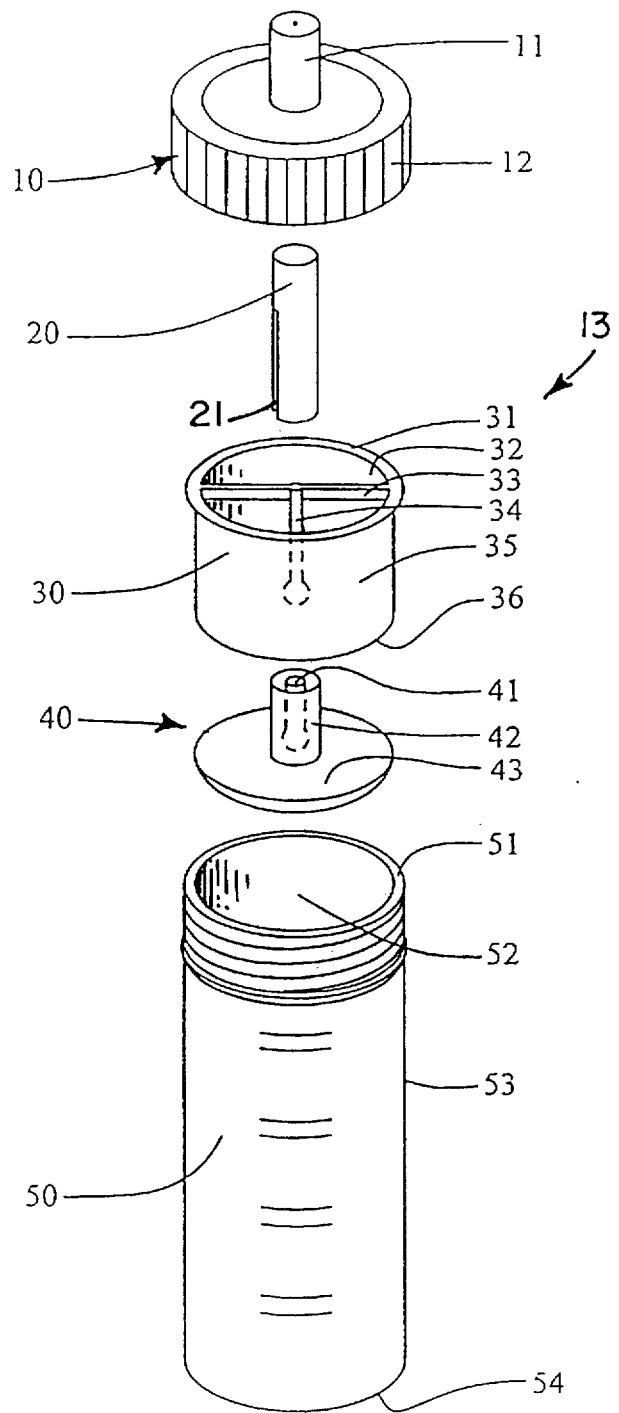
FIG. 1 is an exploded perspective view of an insert embodying the principles of the present invention is shown in conjunction with an off-the-shelf baby bottle.
Figure 2:
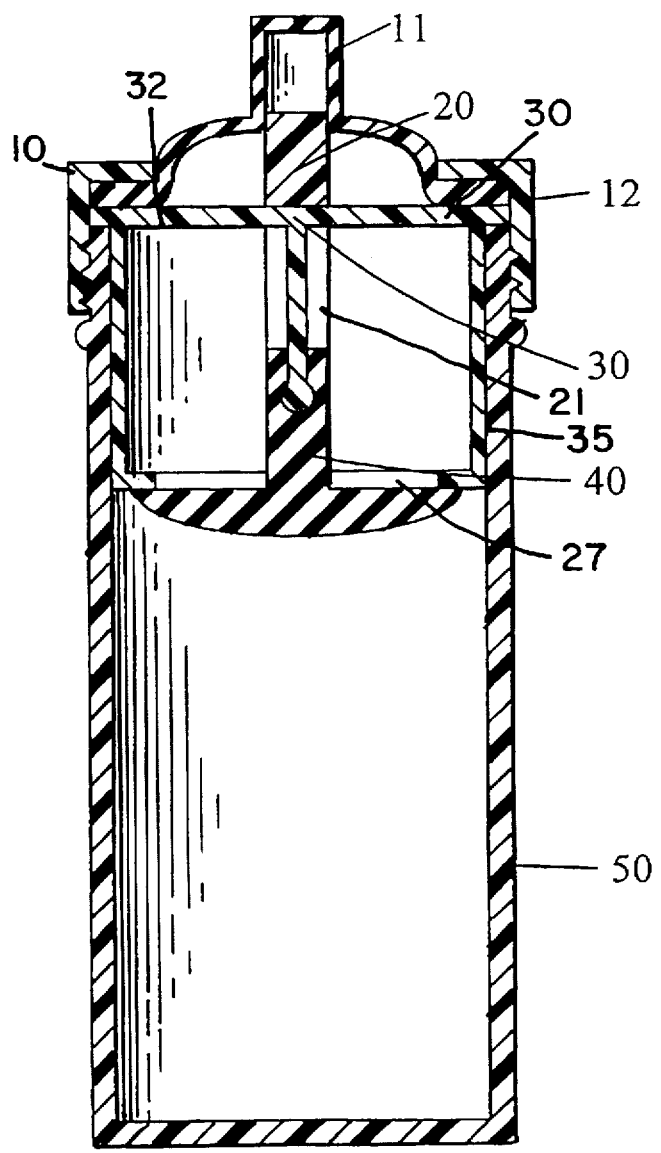
FIG. 2 is a vertical cross-sectional view of the assembled insert used in conjunction with an off-the-shelf baby bottle.

FIG. 1 shows an insert used in conjunction with an off-the-shelf infant feeding bottle. The off-the-shelf bottle is comprised of a bottle 50, and a nipple assembly generally indicated by the reference numeral 10. The nipple assembly 10 normally screws directly to the bottle which has a lip 51 and pinches the rubber nipple 11 between the lip 51 of the bottle and the base 12 of the nipple assembly 10 forming a leak-proof seal. The bottle 50 has a bottom wall 54 so that the bottle 50 can be closed to pour liquid directly into the bottle. The bottom of the bottle can also be open to accommodate a disposable bag. When a disposable bag is used, it is pulled over the lip 51 of the open neck of the bottle 50 and the nipple assembly 10 is screwed in place. The bag is pinched between the nipple assembly 10 and the lip 51 of the bottle 50 forming a leak-proof seal. FIG. 2 shows a cross-sectional view of the assembled bottle and the insert of the present invention.

As shown in FIG. 1, the insert of the present invention is generally indicated by the reference numeral 13 and is comprised of a dry chamber housing 30, a chamber seal generally indicated by the reference numeral 40, and a release member or push rod 20. The chamber of the housing 30 has a top opening 32 and a bottom opening 27 surrounded by a bottom rim 26. The housing 30 has a horizontal cross piece or support 33 that extends across the top opening 32 and a vertical shaft or retaining member 34 extends downwardly from the center of the cross piece 33. The chamber seal 40 seals against the lower rim 36 of the dry chamber housing 30 forming a cup-like container which holds the dry powder. The user attaches the chamber seal 40 to the dry chamber housing 30 and fills the sealed chamber or compartment with a measured amount of powdered formula. After the dry chamber of the housing 30 has been filled with powdered formula, the user attaches the push rod and the insert is completely assembled. The insert is of a width and shape which allows the user to slide it into the open neck 52 of the bottle. The upper end of the housing 30 has a flange 31 to prevent the insert from sliding too far into the bottle 50. The length of the dry chamber housing 30 can be varied depending on the size of the bottle it is used with. Most baby bottles are either four or eight ounces. Powdered formula is usually mixed using a ratio of two ounces of water to one scoop of formula. Using this convention, the length of the insert needs only to be long enough to hold two scoops of formula for the four ounce bottle and four scoops of formula for the eight-ounce bottle but any length or size may be used.

The lip 51 of the bottle and the nipple assembly 10 contact the flange 31 of the dry chamber housing 30 to form a leak proof seal at the top of the housing 30. A gasket or other material may be used between the lip 51 and the flange 31 to enhance the seal if necessary. After the assembled insert is placed into the top opening 52 at the neck of the bottle, the user screws the nipple assembly 10 over the assembled insert to complete the seal. When it comes time to feed the infant, the user pushes on the nipple 11 enough that the push rod 20 applies pressure to the vertical element 42 of the chamber seal 40 and opens a space between the horizontal element 43 of the chamber seal and the lower rim 36 of the dry chamber housing 30. This space creates a channel between the bottle 50 and the dry chamber housing 30 and enables the water and powder to be mixed by shaking the bottle assembly.

Figure 3:
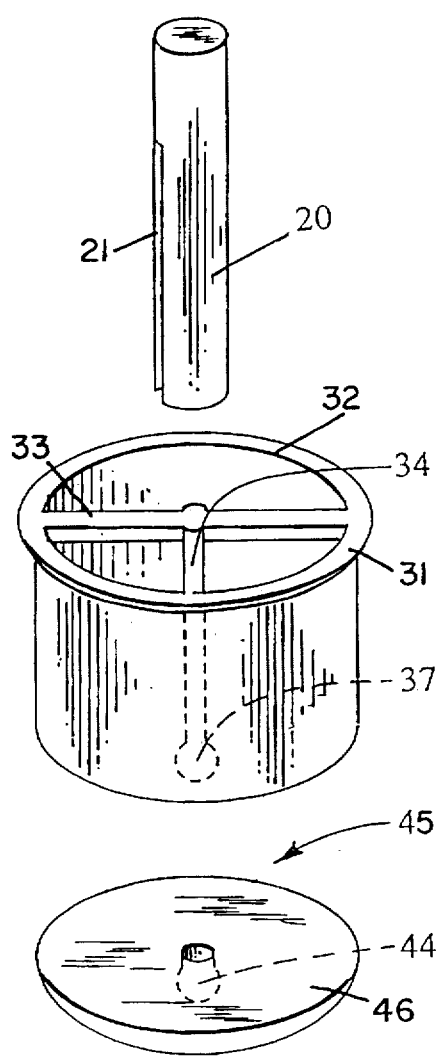
FIG. 3 is an exploded perspective view of a first modification of the insert.

Depending on the application as well as personal preferences, the length of the vertical element 42 of the chamber seal 40 and the vertical shaft or retaining member 34 on the dry chamber housing 30 can be varied to provide several options to the design. One option allows the chamber seal 40 to stay in place on the vertical shaft 34 as the formula is being consumed. The formula flows around the chamber seal 40 and through the open channel to the nipple. Another option has a shorter vertical shaft 34 and/or vertical element 42 to permit the chamber seal 40 to slide off the end of the vertical shaft 34 allowing the chamber seal 40 to drop into the bottle 50. The chamber seal 40 then acts as an agitator to assist in mixing the powdered formula and water. The purpose of the vertical element 42 varies depending on the configuration. It can enhance the integrity of the chamber seal 40 to prevent water from entering the dry chamber during the storage interval. It can also provide a stable support to suspend the chamber seal 40 while the formula is being consumed and it should keep the chamber seal 40 from blocking the flow of formula when using the agitator option. If desired, the vertical element 42 may be eliminated. As shown in FIG. 3, chamber seal 40 is used with a means to release the chamber seal such as a push rod 20. The vertical shaft 34 has an enlargement 37 on the end while the horizontal element 43 chamber seal 40 has a cavity 44 for receiving the enlargement 37. The mating surfaces are engaged during storage. When it is time to dispense the formula, the user pushes on the push rod 20 and the chamber seal 40 drops into the bottle 50, allowing it to be used as an agitator.

Figure 4:
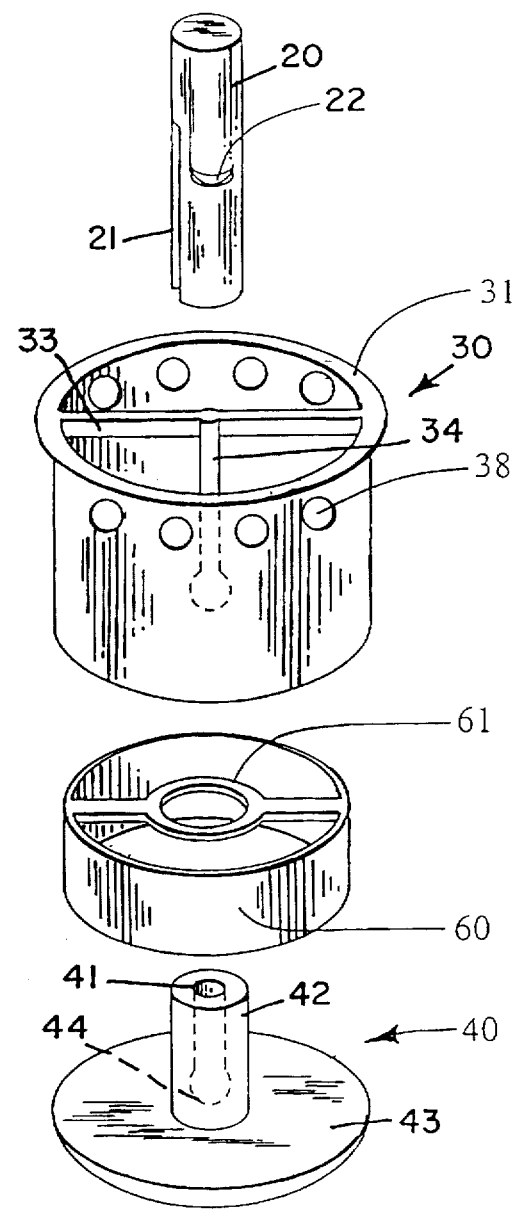
FIG. 4 is an exploded perspective view of a second modification of the insert.

Baby bottles are generally round and have a screw type cap. This invention however, is not restricted to being used with this type of container. An insert of any shape can be designed to be used with any comparable container. A screw-type cap is not a requirement as long as the insert is formed to provide a leak proof seal between the cap and bottle. Referring to FIG. 1, it is generally preferred that the outside diameter of the dry chamber housing 30 as measured across the outer surface 35 be just a little smaller than the inner wall of the bottle 50. If the dry chamber housing is made too large, it will bind against the inner wall of the bottle 50 and noticeably affect the ease of assembly and disassembly. If the diameter of the dry chamber housing 30 is made too small, when the bottle is inverted to dispense the formula, there will be a small amount of formula left between the outer surface 35 of the dry chamber housing and the inner wall of the bottle 50. This formula will be unusable until the bottle is disassembled. As shown in FIG. 4, this can be alleviated by using a series of relief holes 38 just below the flange 31 of the dry chamber housing 30. Using relief holes is most important when designing a general purpose insert to be used with many different bottles. This will require the use of an additional sleeve 60 to block the holes and prevent water from entering the dry chamber. The means to release the chamber seal will also have to move the sleeve as well as the chamber seal 40 when the formula needs to be mixed. One way to accomplish this is by using a protruding tab 22 on the push rod 20 in conjunction with a circular element 61 on the sleeve 60.

As depicted in FIG. 1, means to release the chamber seal 40 is provided by using the horizontal support 33 and the vertical shaft 34 that extends from the horizontal support 33. There are many other ways to release the seal. This will be discussed further on but not for the purpose of limiting the invention. As drawn, the horizontal support 33 supports the centrally located vertical shaft 34. The purpose of the vertical shaft is twofold as it is used to stabilize the push rod 20 and to hold the chamber seal 40 in place. The push rod 20 can be manufactured with a push rod slot 21 which is of a size and shape that allows it to slide over the horizontal support 33. Stability will be enhanced by making the vertical shaft 34 slightly larger than the horizontal support 33 and using a mating surface having grooves 49 centrally located and extending along the length of the interior of the push rod slot 21' of a first modified push rod 20' as shown in FIGS. 5 and 6. This allows the push rod 20 to slide vertically up and down the vertical shaft 34 while preventing lateral movement along the horizontal support 33. The shape of the vertical shaft 34 is not important, but a rounded shape has several advantages.

As shown in FIGS. 7 and 8, an example of a variation in the means to release the chamber seal 40 using the horizontal support 33 and the vertical shaft 34 is to provide a series of tabs 23 located on the bottom of the interior surface of the slot 21" of a second modified push rod 20". The tabs should be slightly rounded on both the upper and lower surfaces to provide for easy installation and removal of the push rod 20". If the push rod is formed out of a pliable material, the user can press the push rod 20" over the horizontal support. The tabs cause the push rod slot 21' to widen slightly and then snap back together. The tabs prevent the push rod 20' from moving laterally along the horizontal support 33 and keep the push rod 20" from sliding off the horizontal support 33. Another similar set of tabs 24 may be added on the interior surface of the push rod slot 21" close to the top of the push rod slot 21". The tabs are located to allow the user to push on the nipple 11 and move the push rod 20" down until the tabs move past the horizontal support 33 and lock the push rod 20" in place. The purpose of these additional tabs are to prevent the push rod 20" from sliding back into the nipple 11 thus impeding the flow of formula.

One of the problems associated with this type of device is the tendency for powdered formula to collect in the nipple 11 and impede the flow of formula. There are a few variations to the design of the push rod 20 that can be used individually or in combination to prevent this. One variation is to lengthen the push rod 20 enough to allow the top portion of the push rod 20 to extend to the top of the nipple 11. This will allow the push rod 20 to block the hole in the nipple 11. The width of the push rod 20 or a portion of it can also be made wide enough to allow a seal to form between it and the inside surface of the nipple. Another suggestion for the design of the push rod 20 is to dimple the top of the push rod slightly to prevent distortion of the hole in the end of the nipple 11 when the user pushes on it to mix the ingredients.

The chamber seal 40 should be made of a pliable material to allow a good seal between it and the dry chamber housing 30. The shape of the chamber seal 40 can vary depending on personal preference and configuration. As depicted in FIG. 1, the chamber seal is mushroom shaped. The chamber seal 40 has been drawn with a vertical element 42 which has a vertical bore 41 that receives the vertical shaft 34. The vertical shaft 34 can be made with one or more enlarged portions near the tip. If the inner surface which defines the bore 41 is formed to mate with the enlargement on the vertical shaft 34, the seal between the chamber seal 40 and the dry chamber housing 30 can be enhanced. This will also prevent the chamber seal 40 from inadvertently sliding along the vertical shaft 34 and compromising the seal. It is also suggested that the chamber seal 40 be made with one or more protrusions along the bottom surface of the horizontal element 43. The purpose of these protrusions becomes more important when utilizing the optional shorter vertical shaft 34 and/or vertical element 42 discussed above. This option permits the chamber seal 40 to slide off the end of the vertical shaft 34 allowing the chamber seal 40 to drop into the bottle. The protrusions will prevent the bottom portion of the horizontal element 43 from blocking the passage of formula through the insert if the chamber seal 40 becomes inverted and seats on the lower surface 36 of the dry chamber housing 30. It is suggested that the shape of the chamber seal 40 and any protrusions allow the insert to stand vertically on a flat surface to provide a platform when filling the insert with powdered formula.

It is believed that the novelty of this invention lies in several areas. One area pertains to the idea of using an insert rather than designing a bottle with a special chamber neither of which is of any use without the other. An additional area pertains to the insert fitting between the nipple assembly 10 and the bottle 50 while still allowing the nipple assembly 10 to be directly attached to the bottle 50. This allows the insert to be used with existing bottles which is an added benefit since the consumer can use bottles they have already purchased. Many related inventions force the consumer to purchase an entire assembly with a specially made bottle which can be much more costly, especially when purchasing several units. An added benefit is that the overall height of the bottle with the insert in place has not increased. Another novel area relates to the means to release the chamber seal being accessible by pushing the nipple. Other inventions in this area have not incorporated this principle of operation. An additional area relates to the use of the push rod 20 to seal the nipple 11 to prevent the powdered formula from caking up in it. A further novel area relates to the chamber seal 40 and dry chamber housing 30 together form a very compact assembly which allows the user to stand the assembly vertically on a flat surface to provide a platform when filling the it with powdered formula. Much of the frustration of feeding a child on the road from a large can of formula can be eliminated by providing an optional lid to seal the top of the dry chamber housing. In anticipation of being on the road, the user attaches the chamber seal 40 to the dry chamber housing 30 of one or several units and sets them on a flat surface. Each unit is filled with a measured amount of powdered formula and the optional lid is placed on the top of the dry chamber housing 30 forming a compact carrier. The optional lid could provide a clip to hold the push rod 20, keeping all of the parts together. To use the apparatus with the optional lid in place, the user simply slides the insert into the bottle 50 and then removes the push rod 20 from the lid. The lid is removed and the push rod 20 is put in place on the dry chamber housing 30 followed by the attachment of the nipple assembly 10. Other novel areas should be apparent from the drawing as well as the description.

There are many variations that may be employed in the design of the insert. It is believed that this design with a separate push rod 20 and combination of horizontal support 33 with a vertical shaft 34 is the most useful and sturdy. Several other variations are discussed here but not for the purpose of limiting the invention. For example, FIG. 9 shows the horizontal support 33 designed with a centrally located circular or otherwise shaped surface 39 designed to fit around the push rod 20 instead of using a slot in the push rod 20. The horizontal support 33 would fit around the outer surface of the push rod 20 and still allow the push rod 20 to move up and down and would also prevent lateral movement. Multiple supports could also be used. Additionally, FIG. 10 shows a modified chamber seal or closure 55 which uses an added ridge 48 located around the outer perimeter of the seal which seats along the lower surface 36 of the dry chamber housing 35 and holds the seal in place. This ridge would eliminate the need for a vertical element on the chamber seal 55 but would bind more and require additional force to release the seal. Furthermore, FIG. 11 shows the seal 55 and push rod 20 formed into one piece by using this ridge-type seal 48 eliminating the need for a vertical shaft 34 and/or horizontal support 33. This configuration could be utilized with or without a horizontal support 33. Using the horizontal support 33 would most likely employ the centrally located circular or otherwise shaped surface previously described in this paragraph. Another variation to the design would employ a screw thread on the push rod 20 and a circular guide on the horizontal support 33. In this configuration, the chamber seal 40 would be released by rotating and/or pushing on the push rod 20. Further variations may be employed in the design of the insert but none that will appreciably change the fundamental design.

I claim:

1. An insert for an infant feeding bottle having a chamber, an upper end for receiving a nipple assembly, said upper end having an upper access opening to the chamber and an annular rim surrounding the upper access opening, said insert comprising:

(a) a housing having a compartment for storing powdered formula, a top opening to the compartment and a bottom opening to the compartment, said housing being adapted to be inserted into the chamber of said bottle;

(b) an upper flange on the upper end of said housing for engaging said annular rim and for supporting said housing on said bottle between said annular rim and said nipple assembly;

(c) a closure for releasably sealing the bottom opening of said housing, said closure having a horizontal portion for closing said bottom opening and a vertical portion which extends upwardly from said horizontal portion, said vertical portion having an upwardly facing cavity;

(d) a retaining member fixed to said housing and extending downwardly toward said bottom opening for insertion into said cavity for releasably retaining said closure in sealing position at said bottom opening; and (e) a removable rod supported by said housing for movement toward said closure and for being accessible through said nipple assembly to enable said rod to be pushed downwardly against said closure for moving said closure downwardly relative to said retaining member and away from said bottom opening.

2. An insert for an infant feeding bottle having a chamber, an upper end for receiving a nipple assembly, said upper end having an upper access opening to the chamber and an annular rim surrounding the upper access opening, said insert comprising:

(a) a housing having a compartment for storing powdered formula, a top opening to the compartment and a bottom opening to the compartment, said housing being adapted to be inserted into the chamber of said bottle said housing having at least one aperture extending from said compartment to outside of said housing;

(b) an upper flange on the upper end of said housing for engaging said annular rim and for supporting said housing on said bottle between said annular rim and said nipple assembly;

(c) a closure for releasably sealing the bottom opening of said housing, said closure having a horizontal portion for closing said bottom opening and a vertical portion which extends upwardly from said horizontal portion, said vertical portion having an upwardly facing cavity;

(d) a retaining member fixed to said housing and extending downwardly toward said bottom opening for insertion into said cavity for releasably retaining said closure in sealing position at said bottom opening;

(e) a removable rod supported by said housing for movement toward said closure and for being accessible through said nipple assembly to enable said rod to be pushed downwardly against said closure for moving said closure downwardly relative to said retaining member and away form said bottom opening; and (f) a sleeve slidably mounted on said housing for movement between an upper position in which said aperture is blocked by said sleeve and a lower position in which said aperture is not blocked by said sleeve, said sleeve being operatively connected to said removable rod so that downward movement of said removable rod causes said sleeve to move to said lower position.

3. An insert for an infant feeding bottle having a chamber, an upper end for receiving a nipple assembly, said upper end having an upper access opening to the chamber and an annular rim surrounding the upper access opening, said insert comprising:

(a) a housing having a compartment for storing powdered formula, and a bottom opening to the compartment, said housing being adapted to be inserted into the chamber of said bottle and to be supported on the bottle;

(b) a closure for releasably sealing the bottom opening of said housing, said closure having a horizontal portion for closing said bottom opening and a vertical which extends upwardly from said horizontal portion, said vertical portion having an upwardly facing cavity;

(c) a retaining member operatively connected to said housing and extending downwardly toward said bottom opening for insertion into said cavity for releasably retaining said closure in a sealing position at said bottom opening; and (d) a release member supported by said housing for downward movement toward said closure to enable said release member to be pushed downwardly against said closure for moving said closure downwardly relative to said retaining member and away form said bottom opening.

4. An insert for an infant feeding bottle as recited in claim 3, wherein said housing has a top opening to the compartment and said release member extends above said top opening so that said release member can be manually accessed through the nipple of a nipple assembly placed on the upper end of said bottle.

5. An insert for an infant feeding bottle having a chamber, an upper end for receiving a nipple assembly removably connected to the upper end of the bottle, said nipple assembly including and elastomeric nipple, said upper end having an upper access opening, said insert comprising:

(a) a housing having a compartment for storing powdered formula, a top opening to the compartment and a bottom opening to the compartment, said housing being adapted to be inserted into the chamber of said bottle and to be supported on the bottle so that the top opening of said compartment is isolated from said chamber and said bottom opening is exposed to said chamber;

(b) a closure for releasably connected to said housing in a closed position for closing said bottom opening said closure being releasable from said closed position in response to downward pressure on said closure, said closure having a horizontal portion for closing said bottom opening and a vertical which extends upwardly from said horizontal portion, said vertical portion having an upwardly facing cavity; and (c) an actuator being guided for vertical movement relative to said housing, said actuator having a lower end extending to said closure, said actuator having an upper end which extends above the top opening of said housing for being positioned below said nipple, so that said actuator can be pushed downwardly from said nipple for applying downward pressure to said closure and moving said closure downwardly away from its closed position for connecting said compartment to said chamber.

* * * * *